April 16, 1968  J. T. CHERRY, JR  3,378,096
METHOD OF SEISMIC ENERGY INTERFERENCE CANCELLATION BY
DETECTING SINGULARLY ORIENTED PARTICLE MOTION
Filed May 12, 1966  2 Sheets-Sheet 2

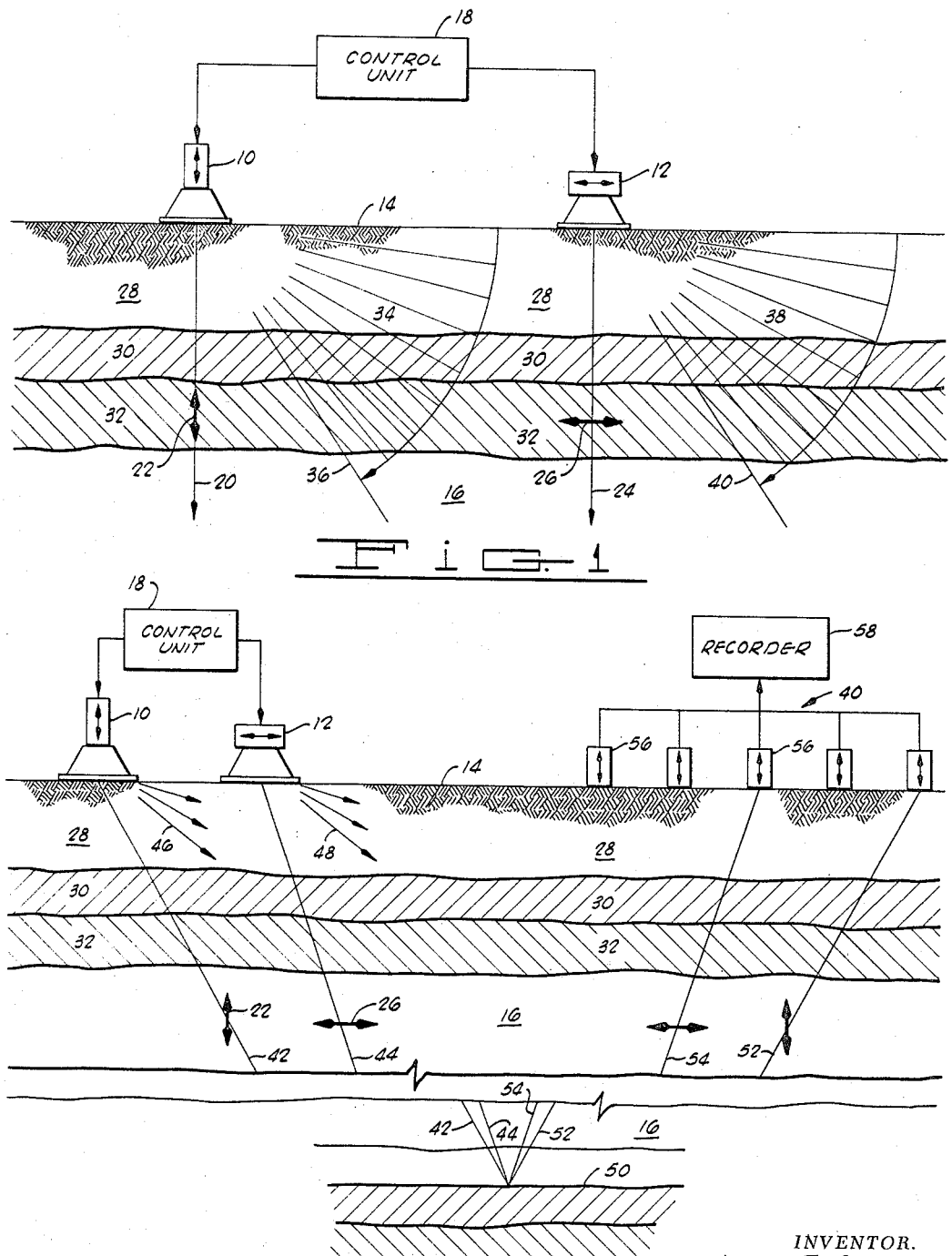

INVENTOR.
JESSE T. CHERRY, JR
BY
William J. Miller
ATTORNEY 3,378,096
METHOD OF SEISMIC ENERGY INTERFERENCE CANCELLATION BY DETECTING SINGULARLY ORIENTED PARTICLE MOTION
Jesse T. Cherry, Jr., Castro Valley, Calif., assignor to Continental Oil Company, Ponca City, Okla., a corporation of Delaware
Filed May 12, 1966, Ser. No. 549,537
7 Claims. (Cl. 181—.5)

ABSTRACT OF THE DISCLOSURE

A method of cancelling unwanted seismic energy causing interference with desired signals by generating a seismic wave into the earth having particle motion predominantly in one direction and then generating at a predetermined later time a second seismic wave having particle motion normal to said first generated seismic waves and then detecting the particle motion in a single direction resulting from both said first and second generated seismic waves.

---

This invention relates to improvements in the art of geophysical prospecting, and more particularly, but not by way of limitation, it relates to an improved method for geophysical prospecting wherein seismic energy interference originating at the seismic energy source is effectively cancelled.

There are two general types of seismic wave signals which have been found suitable for propagation through the earth in geophysical prospecting. Each of the types of seismic wave will propagate through the earth as the result of a physical disturbance at the surface in such a manner as to be reflected from the various subterranean interfaces and thereby provide a suitable energy probe for seismographic surveying. One such wave is the so called pressure or compressional wave which is sometimes referred to as the longitudinal type of wave because the earth particle motion is in the direction of wave propagation. The other is shear wave, so called because it gives rise to particle motion generally normal to the direction of wave propagation. In addition, when the shear wave particle motion is oriented normal to the plane of incidence, which is defined as the vertical plane passing through both the surface point of origin and surface point of detection of the waves, the waves may be defined as horizontal shear (SH) waves, and when the particle motion is oriented within the plane of incidence, the waves are defined as vertical shear (SV) waves.

Heretofore, virtually all seismographic surveys have been complied by the use of compressional waves which may be generated by dynamite, weight drop, gas gun or, more recently, a vibrator driven at a controlled frequency rate. The recent work with shear waves has established that they too can be suitable for acquiring subsurface stratigraphic determinations. The wave velocities and behavior as between compressional and shear waves varies to a certain extent and compressional waves are generally relied upon. However, shear wave surveying has proven to be valuable under certain conditions of lithology and stratigraphic structure.

It has been known that generation of compressional waves gives rise to non-random seismic energy interference patterns which come about as a result of largely unknown behavior in the weathered layer and other shallow sub-surface layers. This interference is generally made up of refracted compressional waves and refracted shear waves as well as compressional and shear energy waves which become completely or partially trapped within the near-surface layers. In any event, this pattern of seismic energy interference is predictable within certain bounds of probability if the necessary physical parameters are known such that separate cancellation measures can be considered. It has been found that the horizontal vibrator generates a near-surface seismic energy interference pattern which is highly similar to the above interference generated by the vertical vibrator source. That is, that although the shear wave is generated with the major, usable portion of the energy being propagated vertically to the deeper strata, refracted compressional waves, refracted shear waves, and various other surface waves still are generated.

The present invention contemplates a method of geophysical prospecting wherein two seismic sources are employed, a compressional wave source and a shear wave source to produce the initial seismic energy disturbance for propagation through the sub-strata. The reflected seismic energy can then be detected at a particular orientation of signal pick-up so as to differentiate between the compressional wave indications (particle motions vertical) and the shear wave indications (those which would have horizontal particle motion). Thus, the directional geophones pick up the desired or usable stratigraphic data. However, the geophones will also pick up the seismic energy interference signals from both the vertical and the horizontal transducers or sources. Acting independently of the deep-strata, desired reflection data, the two separate seismic energy interference patterns can be adjusted in phase by suitable filtering means to provide effective cancellation one to the other.

The method of the present invention further contemplates that either horizontally or vertically oriented detecting means can be employed to obtain either the shear wave or compressional wave deep-strata data, while still enabling the cancellation of the seismic energy interference pick-up. The method encompasses that operation wherein the vertical and horizontal vibration sources are operated simultaneously and seismic energy interference cancellation is effected by phase adjustment of the sources such that the detecting elements see a cancelled effect. The method also contemplates sequential operation of the vertical and horizontal source such that separate recordings of the interference pattern can be made and then the mixing of the two records to effect cancellation of interference can be done at any subsequent stage of the reflection record analysis.

It is an object of the present invention to provide a method of seismic surveying wherein certain forms of seismic energy interference are cancelled.

It is also an object of the present invention to provide a method of effecting cancellation of seismic energy interference arising from and traveling through the surface and near-surface strata of the earth.

It is another object of this invention to provide a seismic survey method wherein compressional waves are utilized to recover deeper stratigraphic information and seismic energy interference apparent in the near-surface layers can be effectively cancelled.

It is further an object of the invention to provide a seismic survey method wherein shear waves are generated and detected to reveal deep strata information and shallow traveling seismic energy interference can be effectively cancelled.

It is still further an object of the present invention to generate both compressional and shear (SV) wave energy while detecting the return by vertically oriented geophones such that vertical components of both waveforms can be received for signal processing and cancellation of certain seismic energy interference.

Finally, it is an object of the present invention to generate both compressional and shear (SV) wave energy while detecting the return by horizontally oriented geophones such that horizontal components of both waveforms can be received for signal processing and cancellation of certain seismic energy interference.

Other objects and advantages of the invention will be evident from the following detailed description when read in conjunction with the accompanying drawings which illustrate the invention.

In the drawings:

FIG. 1 is an illustration of the seismic interference generation from both shear and compressional wave sources;

FIG. 2 is a functional illustration of one form of the method wherein compressional waves with vertical particle motion are employed for deep strata data recovery.

General

Figure 3:
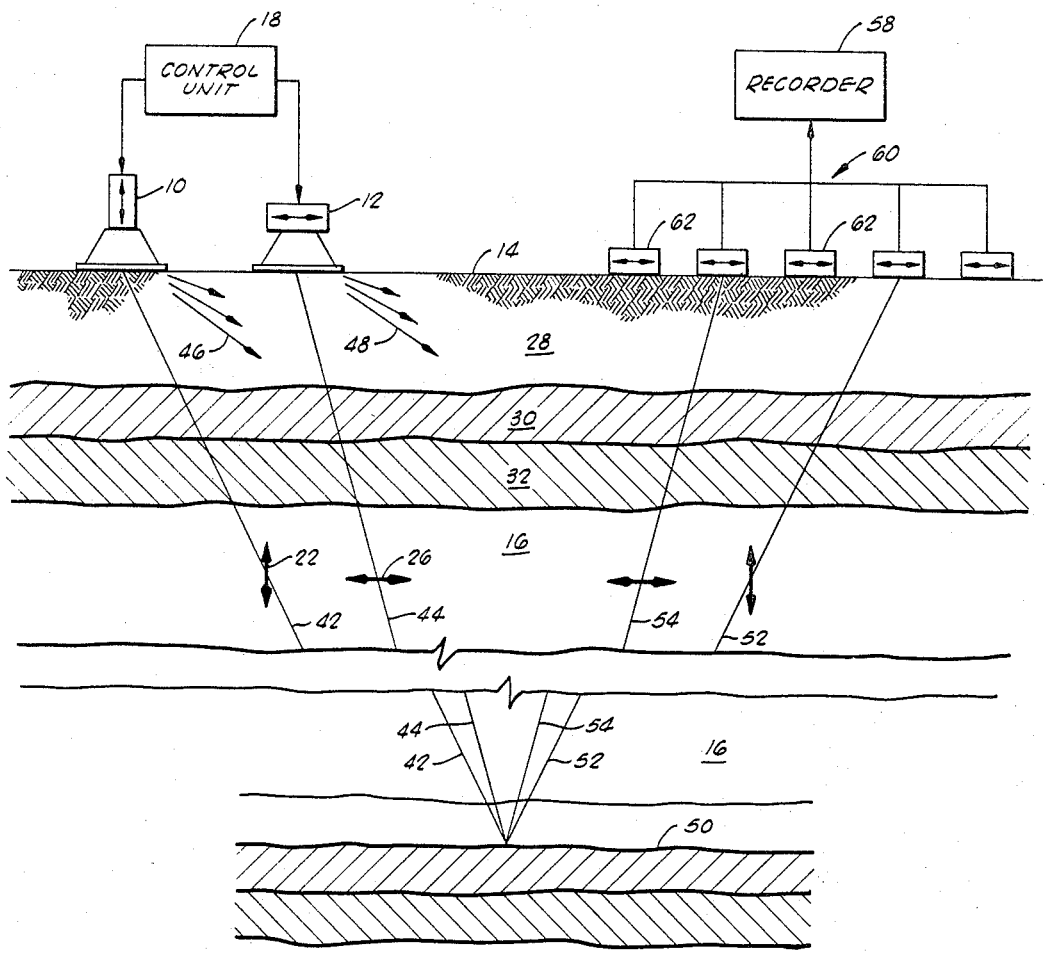
FIG. 3 illustrates another form of the invention wherein shear waves with horizontal particle motion are employed for deep strata data recovery.

Whenever seismic energy is introduced into the earth a portion of the input energy will propagate in its proper or intended form to the deeper parts of the subsurface. However, a substantial portion of the energy will become trapped by reflection, refraction, and change of wave type in the near-surface layers of the earth. This is true whether the initial input seismic motion is vertical or horizontal in orientation and a great similarity exists in the seismic energy content of the near-surface layers for either type of input. The seismic energy interference within the near-surface layers will contain components of both compressional type waves and shear type waves, as well as certain, well-known variations known as Love and Rayleigh waves, such that the overall energy content can be predicted with some degree of certainty for each particular locale, if the necessary physical parameters be known.

FIG. 1 shows a vertical vibrator 10 and a horizontal vibrator 12 coupled to the surface 14 of earth formation 16, both vibrators 10 and 12 being driven by a suitable control unit 18. The horizontal vibrator 12 is oriented to vibrate in-line with the vertical vibrator 10 in the plane of incidence (the cross-sectional plane of the drawing) such that shear waves are generated in the earth 16, and they are of the SV type.

The vertical vibrator 10 imparts both compressional and shear waves (SV) into the earth 16. However, near the vertical axis 20, in which direction the energy for reflections propagate, the particle motion is predominantly vertical in the direction shown by the heavy arrow 22. Similarly, the horizontal (in-line) vibrator 12 is coupled to the earth 16 to impart shear (SV) waves, but it also produces compressional waves. However, near the vertical axis 24, in which direction the energy for reflections propagates, the particle motion is predominantly horizontal in the direction of the heavy arrow 26. Thus, for either the compressional or the shear type of wave, the vertically traveling wave forms (that energy which travels to the deeper earth strata and is therefore desirable for reflection recording) adhere most strictly to a uniform particle motion. It should be understood that the vertical designators 20 and 24 are only intended to mean generally downward as would include all projection angles affording usable, deep reflected seismic energy.

The compressional waves from vibrator 10 would travel downward (with vertical particle motion) through the weathered layer 28, near-surface strata 30 and 32, and on downward through the earth 16 to be further reflected and/or refracted at the various subterranean interfaces. From the vibrator 10 a certain portion of energy (of both compressional and SV types) will also be present in the more horizontally radiated sector 34, shown bounded by the line 36. The sector 34 is only intended to be a general showing and should not be construed as a precise limit or technically limiting factor. This wave energy will exhibit different behavior since the wave fronts are no longer parallel to the general plane of interfaces and it reacts with the lower density and velocity materials within the weathered layer 28 and the near-surface strata 30 and 32. As the angle of incidence to the general plane of near-surface interfaces decreases, an increasing amount of seismic energy is trapped within the weathered layer 28 and/or near-surface strata 30 and 32 to be reflected and refracted to the geophone or detector array (not shown) as non-usable, interference energy. Further, in striking an interface, there will be some interchange of energy between wave types in accordance with Huygen's principle. That is, as a wave front spreading out spherically traverses an interface the instantaneous reflected energy behaves as though a point source of energy were continually being energized along the interface to generate both compressional waves and shear (SV) waves.

The horizontal (in-line) type of vibrator 12 will generate both shear (SV) waves and compressional waves. Some of this energy will be propagated in a sector 38, shown generally as bounded by the angular line 40. The sector 38 is also a general showing and it should be understood that the direction and amounts of interfering wave propagation will depend on many factors including the density, velocity and thickness of the weathered layer 28, the densities, velocities and thicknesses of underlying strata, and so forth. In a manner similar to that described for the vertical vibrator, the energy traveling outward from the horizontal vibrator 12 within sector 38 will be reflected and refracted at boundaries, with some interchange of energy between wave types.

During the operation of either a vertical vibrator 10 or a horizontal vibrator 12, it happens that there is a high degree of similarity of the seismic energy interference wave forms which propagate through the respective sectors 34 and 38 to a detecting instrument. This, of course, is dependent upon the vibrators 10 and 12 being operated in adjacent positions over the same terrain such that physical characteristics of the earth will be nearly constant for both of the energy forms. Only near the vertical axes 20 and 24 do the radiation patterns for the vertical vibrator 10 and the horizontal (in-line) vibrator 12 differ by a substantial amount. The vertical vibrator 10 allows compressional energy to penetrate to the deeper earth strata and this energy, when reflected, will return to the earth's surface 14 as a nearly vertical displacement of earth particles. Similarly, the horizontal vibrator 12 will allow shear (SV) energy to penetrate to the deeper earth strata; and when reflected, the energy returns as a nearly horizontal earth particle displacement. The fact that the desirable or deep going seismic energy adheres more strictly to direction orientation, each vibrator type giving rise to a characteristic orientation, while the shallower seismic energy interference patterns for either source are predicted to be similar to one another, provides the basic premise upon which the present method is established as will be more fully set forth hereinafter.

One form of the method

This form of method utilizes the compressional wave energy for deriving stratigraphic data and, in this respect, it produces an end result similar to most previously known seismic prospecting systems; however, the end result will be characterized in that it bears a reduced content of seismic energy interference. The method is described in the following with respect to vibrational type transducers, both the vertical and horizontal types, but it should be understood that all seismic energy sources may be included for possible employment in carrying out the method.

As shown in FIG. 2, the vertical vibrator 10 and horizontal (in-line) vibrator 12 are suitably coupled to the earth 16 in close proximity and both of the vibrator units are connected to be driven from the control unit 18. The control unit 18 designates generally the power and control equipment which is utilized to operate a vibrational seismic energy transducer. The various forms and types of this equipment are well known in the art. The vertical vibrator 10 is also well known in the art and is the particular subject matter of various U.S. patents; for example, U.S. Patent No. 2,910,134 entitled, "Method of Coupling a Vibrator to an Elastic Medium," issued to Crawford et al. and assigned to the present assignee. The horizontal vibrator 12 is also a known type of apparatus and an exemplary disclosure would be U.S. application, Ser. No. 237,661, entitled "Method and Apparatus for Inducing Seismic Shear Waves in the Earth and for Seismic Surveying," now Patent No. 3,286,783 in the name of Cherry et al. as assigned to this assignee.

The vertical vibrator 10 is caused to impart vibratory energy along a generally vertical path 42 wherein the energy has longitudinal earth particle displacement oscillating in the direction of arrows 22. That is, the progressive compressions and rarefactions of the earth particles are oriented in the generally vertical direction 42. The horizontal vibrator 12 is oriented in-line with the incidence plane, that is, its vibration or particle movement orientation is along the line between the compressional wave vibrator 10 and the detector array 40 such that SV type shear waves are generated as seen by the detector array 40. The horizontal (in-line) vibrator 12 imparts its energy in the generally vertical direction 44 to the deeper earth strata. The shear wave particle distrubance will be transverse to its path of propagation as shown by the arrow 26.

Thus, each of transducers 10 and 12 will propagate its energy, with characteristic particle motion, in the generally vertical directions 42 and 44, however, the seismic energy interference components imparted in the direction of arrows 46 and arrow 48 will have essentially the same content or multiples of energy forms. The arrows 46 and 48 designate generally that energy from each of the vertical transducer 10 and the horizontal transducer 12 which will manifest itself as near-surface seismic energy interference. This interference arises from both compressional and shear input energy and interaction in the weathered layer 28 and the near-surface strata 30 and 32.

Deep strata reflections from the main energy paths 42 and 44 will be reflected, for example, at the deep interface 50 and reflected back toward the earth surface 14 on the respective paths 52 and 54. It should be understood that the paths 42–52 and 44–54 are merely one designation of a deep interface reflection path since portions of energy would be reflected from a great number of different depths in accordance with the velocities and the densities of the particular geological section. The paths 52 and 54 denote paths of desirable reflected energy return of both the vertical and horizontally polarized wave types and either one or both can be detected for subsequent processing a the surface 14 of the earth. In this form of the method, the detector array 40 is comprised of a plurality of vertically oriented geophones 56 which discriminate against the shear wave return on path 54 and detect the compressional wave return, it being vertically oriented, on the path 52. Also, the vertically oriented detector array 40 will detect the net vertical component of motion of the surface due to seismic energy interference which is present within the near-surface layers 28, 30 and 32, and so forth, which would be generated from both vibrator 10 and the horizontal vibrator 12 on the paths designated generally as 46 and 48.

In performing the method, the vertical vibrator 10 and horizontal vibrator 12 can be operated either simultaneously or sequentially to enable seismic energy interference cancellation as long as the horizontal vibrator 12 is operated in-line to produce an SV type of shear wave for the comparison. In sequential operation, the vertical vibrator 10 could first be operated throughout a predetermined vibrational sequence and the seismic energy would be detected in the detector array 40 and recorded in a recorder 58 to provide a record of compressional wave deep strata reflections plus vertical component of surface motion due to the seismic energy interference originating from energy propagated on the paths 46. Thereafter, the horizontal (in-line) vibrator 12 would be operated at a similar frequency or vibrational sequence with subsequent detection and recording of the returned energy. Since the geophones 56 are vertically polarized they would not detect the deep traveling shear wave energy present on path 44–54 but they would detect the vertical component of surface motion due to seismic enery interference generated by the shallow-going vibratory energy along the paths 48. This energy return would then be received on a separate trace of the recorder 58, a well-known type of recorder which is widely used in the geophysical prospecting art.

Thus, one vibrational sequence provides a recording of the seismic energy interference plus the deep strata reflection data as conveyed by the compressional wave. The second vibrational sequence provides a recording of only the seismic energy interference data. The two recordings can then be mixed in suitable well-known manner to cancel the interference content and provide only the deep data indications of the compressional waves for the final indication. This result may then be recorded or further processed for removal of still other forms of interfering energy or filter effects.

In order to operate the vibrators simultaneously, it would be necessary to drive the vertical vibrator 10 and the horizontal vibrator 12 at a precisely controlled rate and to impart the necessary phase difference between the two drive signals such that the interfering seismic energy, as it would appear to the detector array 40, would be in cancelling phase. That is, as the seismic energy interference from the lateral and shallow paths 46 arrives at the detectors 56, the seismic energy interference from the shallow paths 48 would also be arriving at a phase opposed or cancelling phase relationship. The deep going compressional wave energy on path 42 and returning on path 52 will still be detected by the vertically oriented detectors 56 and it can then be applied in its interference free condition to the recorder 58.

With the simultaneous operation, an initial test record can be run to determine the proper cancelling phase relationship to be set into the system operation. With vibrators 10 and 12 placed, an identical vibrational sequence is generated, detected and recorded for each. Comparison of the test records then reveals the phase relationships of the non-random, near-surface seismic energy interference. This phase difference may then be interposed in the proper relationship between the drive outputs from control unit 18 to each of the vibrators 10 and 12 so that energy arriving at the geophones will be phase opposed and effectively cancelled.

It is also contemplated that in certain conditions as to the terrain and placement of the equipment, simultaneous operation of the vibrators 10 and 12 can be carried out at predetermined, spaced distances in order to effect a further degree of cancellation of interfering seismic energy. The geophones 56 may be any of the commercially available types such as Ceramic, Variable Reluctance, Electromagnetic, and so forth, as long as the proper polarity of placement is attended to. Recorder 58 may be one of the well-known types which is generally available with seismic field equipment.

*An alternative form of method*

Referring now to FIG. 3, there is a method which enables seismic energy interference cancellation while allowing acquisition of deep strata data as conveyed by shear (SV) waves. The method of FIG. 3 is carried out with essentially the same equipment as the prior method, however, a detector array 60 utilizing a plurality of horizontally oriented geophones 62 is employed. The array of geophones 62 are horizontally oriented so that they detect only the horizontal component of surface motion due to the seismic energy interference originating on the lateral or shallow paths 46 and 48 and, further, they discriminate against the deep data as conveyed by the compressional wave (path 42–52) and detect the deep data as conveyed by the shear wave on path 44 and reflection path 54. Thus, the two units of information would consist of a first record of seismic energy interference plus the deep shear wave data, and a second record or signal content conveying only the seismic energy interference. These separate records or signals would then be combined or correlated to derive only the desired shear (SV) wave response from the deep strata.

The vibrators can again be operated simultaneously or sequentially. If sequential operation is desired, the mixing of the two records can be done at any stage of the reflection record analysis. For simultaneous operation, the phase of the two vibrators 10 and 12 should be adjusted so that interference cancellation is produced directly at the geophone array 60. The two modes of operation are further defined below.

In sequential operation, the vertical vibrator 10 would be operated throughout a predetermined vibrational sequence to impart energy into the earth for reflection detection at the detector array 60. The horizontal geophones 62 would discriminate against the returing vertically oriented particle motion on path 52 but they would pick up a horizontal component of motion of the surface due to the seismic energy interference originating along the lateral angular paths 46. This detected energy would be placed on a first track of the recorder 58. Then the horizontal vibrator 12, vibrating in-line would be operated through the similar vibrational sequence. The horizontally polarized geophones 62 would then transduce both the deep traveling data bearing desired shear wave return on path 54 as well as the seismic energy interference originating along the lateral paths shown generally by arrows 48. This detected energy would be recorded on a second track of the recorder 58. The two tracks of information could then be mixed to cancel out the similar interfering seismic energy present on each of the tracks to further enhance the valid deep strata shear wave data.

This method can also be operated simultaneously as in the prior method. This merely requires that an initial test run be made for each vibrator, as required in the first form of the method, so that the actual energy travel times for each of the vibrators 10 and 12 can be evaluated to yield the necessary phase or time difference. This time difference can then be used to set the phase difference between the two drive outputs of the control unit 18 so that the seismic energy interference arriving at detector array 60 will appear to be in cancelling or 180° phase relationship. Thus, with the proper phase displacement set into the generation of the initial shear and compressional vibratory signals into the earth 14, the seismic energy interference as seen by the geophones 62 will be arriving in phase opposed, cancelling relationship. That is, of course, the horizontal components of motion of the surface due to the seismic energy interference, the vertical components being discriminated against by the orientation of geophones 62. The valid deep strata response, having horizontal particle motion, will be reproduced with marked reduction of seismic energy interference.

The shear wave recording method may also be utilized with particular wave-length spacing of the vertical vibrator 10 and the horizontal vibrator 12 in known manner. In this case simultaneous operation of vibrators 10 and 12 can be carried out and phase cancellation is effected by spacing vibrators 10 and 12 at particular half-wavelength distances. This type of operation would probably only be used in isoltaed instances wherein a particularly strong seismic energy interference of predetermined frequency proportions is encountered. In any event, the prior modes of operation employing either simultaneous, phase-controlled seismic energy generation or sequential pick up with subsequent cancellation of the interference would probably provide sufficient interference cancellation. It should be understood that a truly versatile field system would include both horizontal and vertical arrays of geophones or an easily orientable array and the support equipment would include all of the necessary switching, mixing and recording equipment. These components are generally available on most seismic field equipment carriers.

The foregoing discloses a method which can be employed in different modes of operation, depending upon the desired result, and one which can be readily employed with existing seismic equipment. The method may be performed to render a compressional wave record of deep strata with cancellation of the near-surface seismic energy interference; or, an alternative mode enables the production of a shear wave record with similar cancellation of the near-surface seismic energy interference. The vibrators employed in the method as disclosed herein are well-known in the art, however, it should be understood that other types of sources of the single impulse type might be employed to equal advantage. The recording and detection equipment is comprised of those types which are well-known and generally used in the seismic prospecting art at the present time.

Changes may be made in the combination and arrangement of elements or steps and procedures as heretofore set forth in this specification and shown in the drawings; it being understood, that changes may be made in the embodiments disclosed without departing from the spirit and scope of the invention as defined in the following claims.

What is claimed is:

1. A method of geophysical prospecting with seismic energy interference cancellation comprising the steps of:
   generating first seismic waves in the earth which seismic waves have particle motion oriented in a first direction in the plane of incidence;
   generating second seismic waves in the earth which seismic waves have particle motion oriented in a direction normal to said first direction and in the plane of incidence; and
   detecting particle motion at said first orientation from said first seismic waves; detecting particle motion at said first orientation from said second seismic waves; and adding said detected returned energy of said first and second seismic waves in phase opposition to effect interference cancellation.

2. A method of geophysical prospecting with seismic energy interference cancellation comprising the steps of:
   generating predominantly seismic compressional waves having predetermined frequency characteristics at a first location;
   generating predominantly seismic shear (SV) waves having predetermined frequency characteristics at a second location which is adjacent to said first location;
   adjusting the phase of generation of the compressional and shear (SV) waves so that interference components are phase opposed; and
   detecting singularly oriented particle motions due to reflected seismic wave energy to the exclusion of motions of opposite orientation.

3. A method of geophysical prospecting with seismic energy interference cancellation comprising the steps of:
   generating predominantly seismic compressional waves having predetermined characteristics at a first location;
   generating predominantly seismic shear (SV) waves having predetermined frequency characteristics at a second location which is adjacent to said first location;
   detecting and recording the vertically oriented returned wave motion from said first generation location;
   detecting and recording the vertically oriented returned wave motion from said adjacent generation location; and mixing said recordings in phase opposition to derive only the reflected compressional indications.

4. A method of geophysical prospecting with seismic energy interference cancellation comprising the steps of:
   generating predominantly seismic compressional waves having predetermined frequency characteristics at a first location;
   generating predominantly seismic shear (SV) waves having predetermined frequency characteristics at a second location which is adjacent to said first location;
   detecting and recording the horizontally oriented returned wave motion from said first generation location;
   detecting and recording the horizontally oriented returned wave motion from said adjacent generation location; and
   mixing said recordings in phase opposition to derive only the reflected shear (SV) wave indications.

5. A method of geophysical prospecting with seismic energy interference cancellation comprising the steps of:
   generating predominantly seismic compressional waves having predetermined frequency characteristics at a first location;
   generating predominantly seismic shear (SV) waves having predetermined frequency characteristics at a second location which is adjacent to said first location;
   detecting vertically oriented wave motion from said first location and thereafter producing an interference wave and compressional wave record;
   detecting vertically oriented wave motion from said adjacent location and thereafter producing an interference wave record; and
   mixing said records in phase opposition to produce a compressional wave reflection record.

6. A method of geophysical prospecting with seismic energy interference cancellation comprising the steps of:
   generating predominantly seismic compressional waves having predetermined frequency characteristics at a first location;
   generating predominantly seismic shear (SV) waves having predetermined frequency characteristics at a second location which is adjacent to said first location;
   detecting horizontally oriented wave motion from said first location and thereafter producing an interference wave record;
   detecting horizontally oriented wave motion from said adjacent location and thereafter producing an interference wave and shear (SV) wave reflection record; and
   mixing said records in phase opposition to produce a shear (SV) wave reflection record.

7. A method of geophysical prospecting with seismic energy interference cancellation comprising the steps of:
   generating predominantly seismic compressional waves having predetermined frequency characteristics at a first location;
   generating predominantly seismic shear (SV) waves having predetermined frequency characteristics at a second location which is adjacent to said first location;
   controlling said generations so that both wave outputs have a unique, nonrepetitive frequency content for a predetermined duration and each generation is conducted with a pre-set phase difference as a function of frequency relative to the other; and
   detecting singularly oriented particle motions due to reflected seismic wave energy to the exclusion of motions of opposite orientation.

References Cited
UNITED STATES PATENTS

| | | | |
|---|---|---|---|
| 2,216,452 | 10/1940 | Owen | 181—0.5 |
| 2,740,489 | 4/1956 | White et al. | 181—0.5 |
| 2,927,300 | 3/1960 | Smith | 181—0.5 X |
| 3,003,577 | 10/1961 | Itrin | 181—0.5 |
| 3,260,326 | 7/1966 | Webb | 181—0.5 |
| 3,152,658 | 10/1964 | Doty | 181—0.5 |
| 3,185,250 | 5/1965 | Glazier | 181—0.5 |
| 3,286,783 | 11/1966 | Cherry | 181—0.5 |

RODNEY D. BENNETT, *Primary Examiner.*

SAMUEL FEINBERG, BENJAMIN A. BORCHELT, *Examiners.*

M. F. HUBLER, *Assistant Examiner.*